3,213,072
CHLORINATION PRODUCT OF METHYLMETHACRYLATE

David S. Hoffenberg, Norwalk, and Louis M. Zaccardo, Fairfield, Conn., assignors to American Cyanamid Company, New York, N.Y., a corporation of Maine
No Drawing. Filed Aug. 7, 1961, Ser. No. 129,559
4 Claims. (Cl. 260—89.5)

The present invention relates to a process for the halogenation of various acrylic compounds and to the halogenated compounds per se. Further, this invention relates to a method for the production of polymers of various halogenated acrylic compounds and to the polymers produced thereby. Still further, this invention relates to a process for the production of a novel class of chemical compounds comprising the quaternary salts of the polymers of various halogenated acrylic compounds and to the products produced thereby.

It is an object of the present invention to produce various halogenated acrylic compounds by reacting a halogen gas with a gaseous acrylic compound at a temperature of between about 400° C. and 850° C. It is a further object of the present invention to produce polymers of various halogenated acrylic compounds. It is an additional object of the present invention to produce various quaternary salts of the polymers of halogenated acrylic compounds by reacting said polymeric acrylic compounds with various nitrogen containing materials.

Halogenated acrylic compounds are highly desirable for a multitude of applications. Such monomers are useful as intermediates wherein a large variety of other functional groups may be substituted for the halogen to give new vinyl monomers. The monomers are also useful as intermediates for the preparation of polymers and copolymers thereof which find use as molding compositions, laminating compositions, adhesives, intermediates for the production of various polymeric derivatives thereof and the like. The monomers of the instant invention may also be used as post-formable cross-linking agents in vinyl monomer polymerizations. They also may be used as a component in compositions having flame-retardant properties.

The halogenation of the acrylic compounds adds little to the cost of the halogenated products and consequently the reaction products produced herein are very attractive commercially. The monomeric acrylic starting materials are all well known in the art and may be produced by a variety of known procedures or they may be purchased commercially. One method for the preparation of the monomer, for example, is by reacting acetylene, carbon monoxide and an alcohol at a temperature of 150° C. to 250° C. under super-atmospheric pressure and in the presence of a nickel iodide catalyst such as set forth in U.S. Patents 2,882,297, 2,882,298 and 2,882,299.

The halogenated compounds of the present invention are prepared by halogenation of the acrylic monomers in the vapor phase at relatively high temperatures, i.e., in excess of 400° C. The principal reaction involved in the process of the present invention is the substitution of a halogen atom for a hydrogen atom in the alpha-alkyl group of the acrylic compounds. This process is illustrated by the following equation.

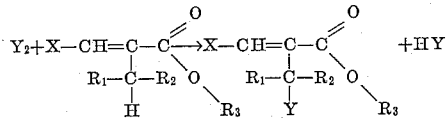

$R_1$ and $R_2$ in the above equation, are substituents selected from the group consisting of hydrogen, methyl and ethyl groups, $R_3$ is a substituent selected from the group consisting of hydrogen, alkyl groups having 1 to 4 carbon atoms and aryl groups, X is a substituent selected from the group consisting of hydrogen, halogen, cyano, aryl, hydroxy, carboxy and $OR_4$ groups wherein $R_4$ is an aryl group and Y is selected from the group consisting of chlorine and bromine.

It was heretofore considered that the reaction of a halogen with an alpha-alkyl acrylic compound would be one of addition at the double bond of the acrylic compound or alternatively, a reaction at the carboxyl function. We have now discovered that the substitution reaction, wherein a halogen atom replaces a hydrogen atom on the alpha-alkyl group positioned on the acrylic chain, is not only possible but may be made to take place to an extent which practically excludes the addition of halogen at the double bond or carboxyl group.

As noted hereinbefore, reaction temperature is critical and clearly influences the course of the reaction in respect to the degree of halogenation and the yield of desired halogenated product. Temperatures varying from at least 400° C. to about 850° C. generally should be employed. Preferably, the reaction temperature is kept within the range of about 550° C. to 750° C. Halogenation within this temperature range is substantially complete. Temperatures exceeding 850° C. may be used but at these high temperatures there is a tendency toward carbonization and consequent fouling of the system. Accordingly, it is preferred that temperatures do not exceed 850° C.

Other than maintaining an excess of the acrylic compound for practical considerations, no significant limits are required in respect to the mole ratio of acrylic compound to halogen employed. The mol ratio of the acrylic feed to that of the halogen may be equimolar but it is preferred that a range of from about 1.1:1 to 10:1 of acrylic compound to halogen, respectively, be employed in order to preclude the possibility that excess halogen will be unused in the system and minimize the possibility that polychlorination will occur.

By the term halogenation in the instant invention, is meant chlorination or bromination, the use of other halogens being impractical, although not impossible, in the present process due to the high cost of these materials and the danger due to the explosive nature of fluorine upon contact with steam.

It is critical in the instant process that the streams of acrylic feed and halogen vapor be kept separate before the actual reaction thereof. It is essential that the two reactants be admixed only in the reactor at the reaction temperatures and not beforehand. Applicants have found by combining the reactants only in the reactor and only when the proper temperature has been attained, that the substitution reaction of the halogen on the acrylic compound takes place substantially to the exclusion of any addition reaction.

Because the reaction progresses so rapidly and the halogen is so rapidly used up in the reaction, the residence time of the reactants in the reactor is not critical and periods varying from about 0.1 to 10 seconds may be satisfactorily employed.

The product is withdrawn from the reactor after this relatively short time and is cooled, condensed and washed, preferably with a suitable aqueous alkaline solution. Suitable aqueous solutions for this washing procedure are solutions of sodium hydroxide, aqueous suspensions of lime, aqueous solutions of sodium carbonate and the like.

The condensed reaction product is then purified by distillation wherein undesired by-products are separated and discarded. A substantially pure, halogenated product is then recovered which may be used for the purposes indicated above.

Certain inert gases, known to the art, are preferably admixed with the gaseous acrylic compound and halogen gas before and/or during the reaction. Various gases may be used for this purpose of which steam, nitrogen, carbon dioxide, helium, neon, argon and the like are exemplary. The amount of diluent gas added is not critical but generally feed streams in which the gas is approximately 50 to 98 mol percent of the total feed mixture may be utilized. The purpose of the gas is to absorb and carry away the heat produced from the reaction of the halogen with the acrylic compound. It is also helpful in minimizing polyhalogenation of the acrylate. Additionally, when steam is used it helps in condensing the reaction products and carrying off the hydrochloric acid or hydrobromic acid produced during the reaction.

As mentioned above, the novel halogenated acrylic compounds of the present invention may be homopolymerized or copolymerized to produce novel resinous compositions. These polymers may be formed by reacting the necessary monomer or monomers at a temperature of from about 20° C. to 130° C., preferably 40° C. to 70° C. The temperature ultimately utilized will depend primarily upon the catalyst which is chosen for the polymerization procedure.

The catalyst may be used in concentrations ranging from between 0.001 to 1.0%, preferably 0.05% to 0.1%, based on the amount of monomer charged into the reaction vessel. Any of the polymerization catalysts which are suitable for use in polymerizing compounds containing an ethylenically unsaturated grouping, specifically a vinyl grouping, can be used. Among such catalysts are materials such as acetyl peroxide, α,α-azobisisobutyronitrile, benzoyl peroxide, tertiary-butyl peroxide, cumene hydroperoxide, hydroxy heptyl peroxide, methyl ethyl ketone peroxide, and the like. Other catalysts which may be utilized are set forth, for example, in United States Patent 2,820,777, patented June 21, 1958.

The polymerization can be carried out by solvent or bulk polymerization techniques. When solvent polymerization is utilized, various solvents such as benzene, dimethyl formamide and the like may be used. The amount of solvent is not critical and generally it is only necessary to use an amount which dissolves the monomer and catalyst present during the polymerization.

When copolymerization of the novel halogenated acrylic compounds of the present invention is carried out, many comonomers polymerizable therewith may be employed. Examples of these comonomers include such compounds as styrene and substituted styrenes such as methyl styrene, ethyl styrene, chlorostyrene; various substituted acrylates such as ethyl acrylate, butyl acrylate, methyl methacrylate, and the like; acrylonitrile, methacrylonitrile, maleic anhydride, vinyl chloride and the like. Additional examples of copolymerizable monomers can be found in United States Patent No. 2,906,724, patented September 29, 1959. The ratio of the novel halogenated acrylic compounds of the present invention to the copolymerizable monomers is generally within the range of from about 5% to 95% to 95% to 5%, respectively, preferably 20% to 80% to 80% to 20%, respectively.

The homopolymers of the present invention will be composed of recurring units of the formula

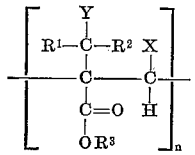

wherein $R^1$, $R^2$, $R^3$, X and Y are substituents as set forth above. The above formula has been indicated without terminal groups inasmuch as it is believed that due to various reactions, e.g. dimerization, which may also occur during polymerization, the terminal groups will usually be catalyst residue and therefore the inclusion of such catalyst residue groups in the formula is not believed necessary or practical.

The present invention is also concerned with the production of various quaternized polymers of the halogenated acrylic acompounds and to the products produced thereby. These novel compounds may be produced either by reacting the polymers of the novel halogenated acrylic compounds of the present invention with various nitrogen containing materials, or by reacting the halogenated acrylic compounds with the nitrogen containing materials and polymerizing the resulting product. Generally, trialkylamines such as triethylamine, trimethylamine, or triethanolamine are employed as the quaternizing agent. Also such materials as pyridine, picolines, and other heterocyclic nitrogen containing compounds and mixtures thereof can be utilized for this purpose.

The quaternization reaction is carried out by contacting the various homopolymers or copolymers of the novel halogenated acrylic compounds of the present invention or the halogenated acrylic compounds per se with the nitrogen compound at a temperature of from about 40° C. to 120° C. The reaction is allowed to continue for about 4 to 8 hours and the resulting reaction solution is then poured into a material which results in the precipitation of the quaternized polymer. The quaternary salts are water-soluble and may be utilized for such products as ion-exchange membranes, polyelectrolytes and the like. Further discussion of this type of reaction can be found in U.S. Patent No. 2,780,604.

The following examples are by way of illustration only and are not to be construed as limitations on the instant invention except as set forth in the appended claims. All parts and percentages are by weight unless otherwise indicated.

*Example 1*

Into a suitable reaction vessel, maintained at 700° C., is introduced a gaseous stream containing 100 parts by weight of methyl methacrylate and 1085 parts by weight of steam, preheated to 700° C. This methyl methacrylate is then allowed to mix and react with a charge of 14.2 parts of chlorine gas similarly diluted and similarly preheated. The mol ratio of methyl methacrylate to chlorine is 5:1 and the residence time of the reactants in the reactor is 0.8 second. The effluent gases are condensed and the insoluble organic layer is separated by gravity. After washing the organic layer with dilute caustic, it is dried and separated into three fractions by distillation. The first fraction, B.P. 48° C./105 mm., is unreacted methyl methacrylate; the second fraction, B.P. 102° C./105 mm., is 95% pure methyl (α-chloromethyl) acrylate; and the third fraction, B.P. 122° C./105 mm., is a mixture of dichlorinated compounds, the major portion of which is methyl, 1-methyl, 1,2-dichloropropionate.

At 700° C. the yield of the desired methyl (α-chloromethyl) acrylate is 86% based on the methyl methacrylate consumed. Analysis of each of the fractions is accomplished by vapor-liquid chromatography.

*Example 2*

The reaction, procedure and amounts of reactants of Example 1 are repeated except that in this case the reaction is allowed to proceed at 500° C. On distillation of the washed and dried organic product, the same three fractions are obtained. However, in this case there are produced considerably more dichloro compounds and correspondingly less desired methyl (α-chloromethyl) acrylate. The yield of desired product at 500° C. is only 60%.

*Example 3*

Into equipment similar to that used in Example 1, are charged separately, five parts by volume of methyl methacrylate and two parts by volume of chlorine, both heated individually to 750° C. In this case, however, argon is used as the diluent and the residence time of this reactant in the reaction zone is 1.2 seconds. The yield of 95% pure methyl (α-chloromethyl) acrylate in this case is 83% on the same basis as defined in Example 1.

*Example 4*

The reaction and procedure, as described in Example 1, is again carried out using a similar molar amount of bromine in place of chlorine. A 70% yield of methyl (α-bromomethyl) acrylate is obtained on distillation of the organic reaction product. As was the case in Example 1, the major side product was a saturated dibromo compound.

*Example 5*

A sample of methacrylic acid (261 parts) is diluted with 3400 parts of steam and allowed to react with chlorine (71 parts), similarly diluted, at 600° C. in a reaction vessel equipped as in Example 1. There is isolated by distillation a 53% yield of α-(chloromethyl) acrylic acid.

*Example 6*

When under the conditions used in Example 5, a similar amount of phenylmethacrylate is substituted for methacrylic acid, there is obtained, on distillation of the organic effluent, a 35% yield of phenyl, (α-chloromethyl) acrylate.

*Example 7*

The procedure and amounts of reactants of Example 6 are repeated except that methyl [β-phenyl, α-methyl] acrylate is substituted for phenyl methacrylate. In this case the product, methyl, [β-phenyl, α-chloromethyl] acrylate is isolated in a 40% yield.

*Example 8*

To a suitable reaction vessel swept with nitrogen and containing 20 parts of methyl (α-chloromethyl) acrylate, is added 0.02 part of benzoyl peroxide. The vessel is sealed and heated in an oil bath at 90° C. for 48 hours, whereupon it sets up to a clear, colorless, solid mass, which can be dissolved in benzene, chloroform or acetone. It can be reprecipitated from any of these solvents by methanol. Infrared examination of the product shows the absence of unsaturation, the presence of ester groups and the presence of $CH_2Cl$ groups. The product is thus a homopolymer of the starting monomeric material.

*Example 9*

Into a suitable polymerization vessel is placed 5 parts of methyl (α-chloromethyl) acrylate, 5 parts of methyl methacrylate and 0.01 part of benzoyl peroxide initiator. The vessel is swept with nitrogen, sealed and heated at 70° C. for 24 hours. There results a clear hard polymeric mass which dissolves in benzene and reprecipitates from that solvent by methanol. There is obtained 8.5 parts of a white, powdery copolymer which on microanalysis for chlorine is found to contain 55 weight percent methyl (α-chloromethyl) acrylate.

*Example 10*

Employing the procedure described in Example 9, 9.0 parts of styrene is reacted with 1.0 parts of methyl (α-chloromethyl) acrylate. Benzoyl peroxide in the same amount is again used as the initiator. After purification of the polymeric material by methanol reprecipitation from chloroform, there is isolated 8.6 parts of a white, powdery copolymer which has incorporated in it 15% of methyl (α-chloromethyl) acrylate.

*Example 11*

Utilizing a procedure similar to that described in Example 9, a tripolymer of styrene, butyl acrylate and methyl (α-chloromethyl) acrylate is prepared by employing azobisisobutyronitrile as the catalytic initiator. The purified tripolymer was found, by microanalysis for chlorine, to contain 13 weight percent of methyl (α-chloromethyl) acrylate. The infrared spectrum of the polymer confirmed the presence of styrene and butyl acrylate in the tripolymeric product.

*Example 12*

The product described in Example 9 (5 parts) is dissolved in 100 parts of dimethyl formamide. To this solution is added 5 parts of pyridine. The mixture is warmed on a steam bath at 85° C. for 6 hours. The resulting solution is poured into 100 pts. of benzene thus resulting in the precipitation of 7.0 parts of a white powdery material. This material is collected on a funnel, washed with more benzene and dried in a vacuum oven. The resulting polymeric product is water-soluble and its infrared spectrum shows the presence of quaternary pyridinium groups. Microanalysis indicates that a large majority (about 85%) of the chlorine groups have reacted with the pyridine, forming corresponding pyridinium salts along the polymer chain.

*Example 13*

The amount of reactants and procedure of Example 12 are repeated except that the product of Example 5 is substituted for the product of Example 9. The material isolated in this case is similarly water-soluble and has about the expected concentrations of quaternary pyridinium groups by infrared analysis. Microanalysis of the polymeric product indicates that the quaternization reaction proceeded quantitatively.

*Example 14*

The amounts of reactants and procedure of Example 13 are repeated with the exception that a mixture of isomeric picolines are substituted for the pyridine. The quaternization reaction with these isomeric picolines proceeds as before, giving a water-soluble polymeric product.

Acrylic compounds which may be used to produce the novel halogenated compounds of the present invention include methacrylic acid, ethacrylic acid, α,n-propyl acrylic acid, α,n-butylacrylic acid, α-amylacrylicacid, methyl methacrylate, ethyl methacrylate, propyl methacrylate, methyl ethacrylate, phenyl methacrylate, phenyl ethacrylate, α-methyl, β-chloro acrylic acid, methyl (α-propyl, β-cyano) acrylate, ethyl (α-methyl, β-hydroxy) acrylate, methyl (α-amyl, β-phenoxy) acrylate, butyl (α-methyl, β-phenyl) acrylate, methyl (α-propyl, β-carboxy) acrylate and the like.

We claim:
1. A compound having the formula

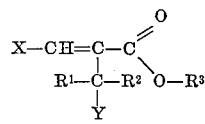

wherein $R^1$ and $R^2$ are substituents selected from the group consisting of hydrogen, methyl and ethyl groups, $R^3$ is a substituent selected from the group consisting of hydrogen, an alkyl group having 1 to 4 carbon atoms, inclusive, and an aryl group, X is a substituent selected from the group consisting of hydrogen, halogen, cyano, aryl, hydroxy, carboxy, and $OR^4$ groups, wherein $R^4$ is an aryl group, and Y is a substituent selected from the group consisting of chlorine and bromine.

2. Methyl (alpha-chloromethyl) acrylate.

3. A polymer of a compound having the formula

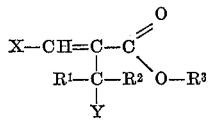

wherein $R^1$ and $R^2$ are substituents selected from the group consisting of hydrogen, methyl and ethyl groups, $R^3$ is a substituent selected from the group consisting of hydrogen, an alkyl group having 1 to 4 carbon atoms, inclusive, and an aryl group, X is a substituent selected from the group consisting of hydrogen, halogen, cyano aryl, hydroxy, carboxy, and $OR^4$ groups, wherein $R^4$ is an aryl group, and Y is a substituent selected from the group consisting of chlorine and bromine.

4. A polymer of methyl (alpha-chloromethyl)acrylate.

References Cited by the Examiner

UNITED STATES PATENTS

| | | | |
|---|---|---|---|
| 2,284,479 | 5/42 | Rust et al. | 260—694 |
| 2,472,811 | 6/49 | Dickey | 260—89.5 |
| 2,843,573 | 7/58 | Melamed | 260—89.5 |

FOREIGN PATENTS 739,746  11/55  Great Britain.

JOSEPH L. SCHOFER, *Primary Examiner.*

PHILIP MANGAN, JAMES A. SEIDLECK, LEON J. BERCOVITZ, *Examiners.*